United States Patent

Cless

[15] 3,647,036
[45] Mar. 7, 1972

[54] FRICTION CLUTCH

[72] Inventor: Gerhard Cless, Skokie, Ill.

[73] Assignee: Teletype Corporation, Skokie, Ill.

[22] Filed: July 6, 1970

[21] Appl. No.: 52,315

[52] U.S. Cl. .................................. 192/26, 192/75, 192/89 R, 192/111 A
[51] Int. Cl. ........................................................ F16d 11/06
[58] Field of Search .................. 192/26, 75, 111 A, 89 R

[56] References Cited

UNITED STATES PATENTS

| | | | |
|---|---|---|---|
| 2,822,904 | 2/1958 | Cheatum | 192/26 |
| 3,044,590 | 7/1962 | Madsen | 192/26 |
| 3,276,555 | 10/1964 | Phelps et al. | 192/89 |

Primary Examiner—Mark M. Newman
Assistant Examiner—Randall Heald
Attorney—J. L. Landis and R. P. Miller

[57] ABSTRACT

A pair of coiled compression springs expand to urge a clutch actuator from an uncoupled to a coupled position in which shoes carried from a driven member couple it to a driving member. In the uncoupled position, the shoes are released from the driving member and the springs are compressed with their axes parallel.

The springs engage the actuator tangentially from opposite sides for urging it angularly and are proportioned such that as the springs expand the distance through which they work increases, and the torque applied to the actuator increases because the increase of torque due to the increase in distance is greater than the loss of torque due to spring relaxation. Accordingly, as the clutch wears torque applied to couple the driving and driven members increases.

4 Claims, 6 Drawing Figures

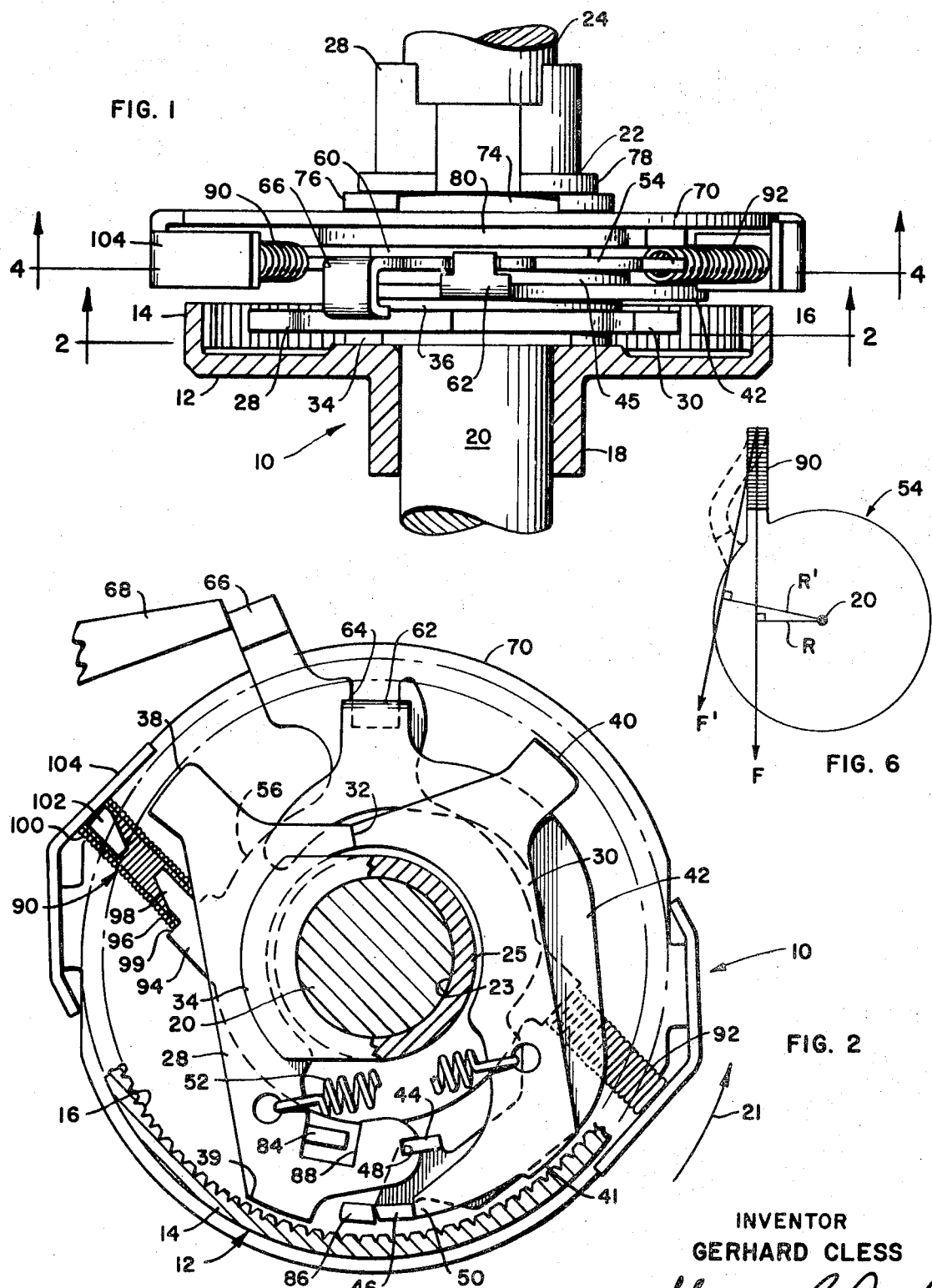

FRICTION CLUTCH

FIELD OF THE INVENTION

The present invention relates to clutches. Particularly the invention relates to friction clutches. Specifically, the invention concerns clutches adapted for teleprinters or similar devices.

BACKGROUND OF THE INVENTION

Clutches for teleprinters used in data communication apparatus should be instantaneous in action and experience minimum slippage between coupled parts during engagement. The imperativeness of the requirement is dictated by needs for highly synchronous operation of the elements in a teleprinter system. For example, when signal impulses are fed to a receiver selector magnet, it is important to have a selector cam sleeve initiate rotation simultaneously with the reception of the first signal impulse.

In heretofore known clutches of the indicated class, typified by Walter J. Zenner U.S. Pat. No. 2,678,118, a shoe assembly and a drum have comprised the elements for releaseably coupling driving and driven members together. An expansion spring provides the agency for urging the shoe and the drum into coupled relationship, their surfaces being held in frictional engagement by the tension of the spring. As engaging surfaces wear, the spring expands and, consequently, the torque for maintaining engagement of clutching parts reduces, the reduction being a function of such wear.

It is an object of the present invention to provide an improved friction clutch.

It is another object of the invention to obviate reduction in clutch-coupling torque occasioned by clutch wear.

It is a further object of the invention to maintain coupling force in a friction clutch at or above a selected level notwithstanding clutch wear.

SUMMARY OF THE INVENTION

To effect the foregoing, and other objects of the invention which will become apparent from ensuing description, a friction clutch has a moveable shoe for releasably coupling driving and driven members together. An angularly moveable component is operably connected to said shoe, and when disposed: (1) in a first angular condition, the driving and driven members are coupled through said shoe, and (2) in a second angular condition, the shoe has been released and the driving and driven members are uncoupled. Means are provided for urging the angularly moveable component toward its first angular condition and for increasing urging torque as said shoe moves towards a position coupling said driving and driven members from a position in which said driving and driven members are uncoupled.

BRIEF DESCRIPTION OF THE DRAWINGS

In the following detailed description of the invention, reference is had to the accompanying drawings in which:

FIG. 1 is a side elevational view of a clutch embodying the present invention, the clutch being in uncoupled condition, its driving member shown in section;

FIG. 2 is a view according to the line 2—2 on FIG. 1;

FIG. 6 is a scheme of the clutch, illustrating its principle of operation.

DETAILED DESCRIPTION OF THE INVENTION

Figure 3:
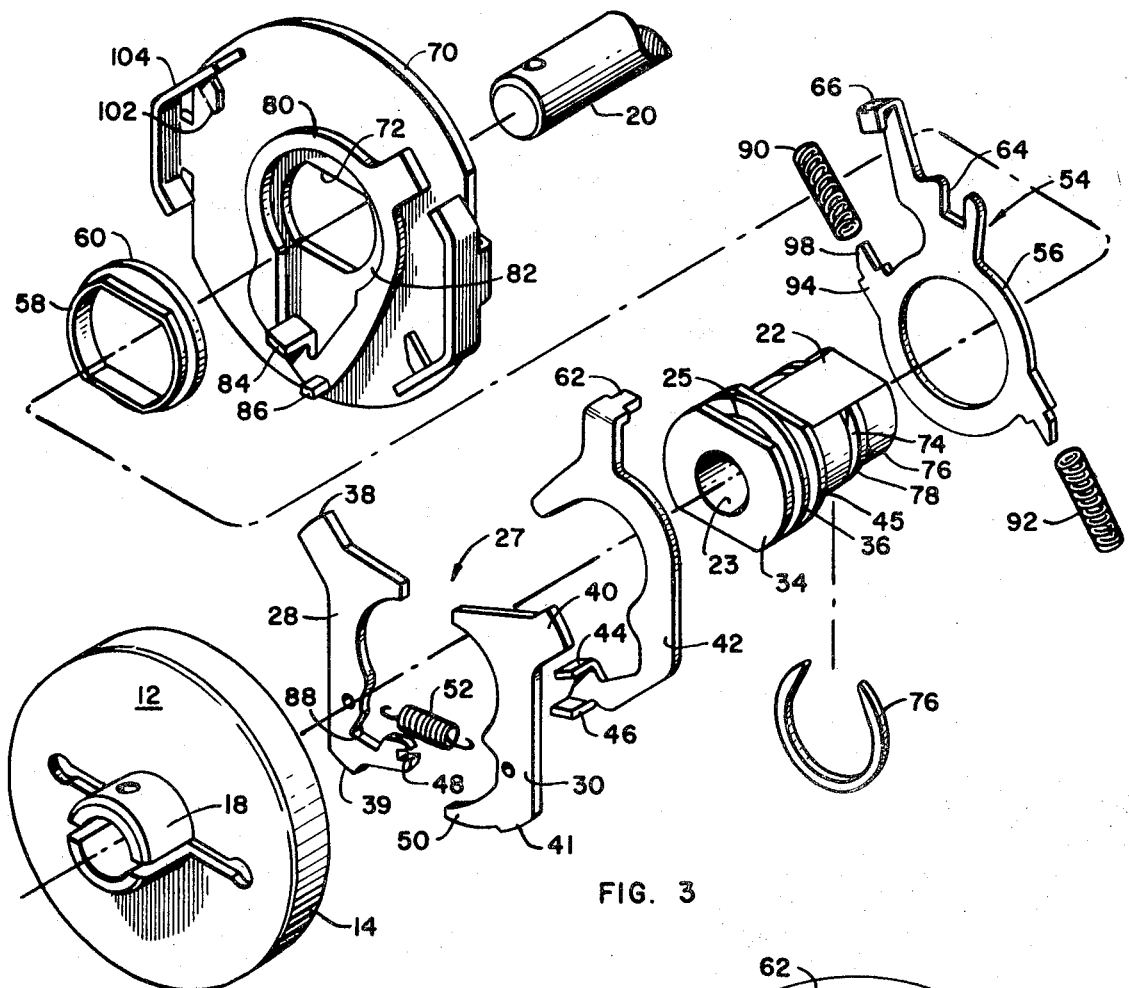
FIG. 3 is an exploded perspective view of said clutch.

Referring now more particularly to the drawings, a friction clutch generally designated 10 is illustrated of the general type disclosed in the Zenner patent. The clutch 10 comprises a metallic driving member 12 fashioned with a drum 14 having an inner peripheral surface 16. A hub 18 of the driving member is rigidly secured to a rotatable shaft 20 for rotating the drum concentrically with the axis of said shaft. The illustrated clutch is adapted for rotation counterclockwise relative FIG. 2 in the direction of arrow 21.

A driven member 22 of the clutch is fashioned as a sleeve and has an internal cylindrical surface 23 (FIG. 3). It is mounted about portion 24 (FIG. 1) of shaft 20 for movement concentrically about the axis of said shaft with driving member 12 when coupled thereto. However, when the driven member is uncoupled, the shaft is rotatable independently thereof. An inner portion 25 of the driven member is disposed within drum 12 and an outer end portion 26 thereof is disposed outwardly from the drum.

Figure 5:
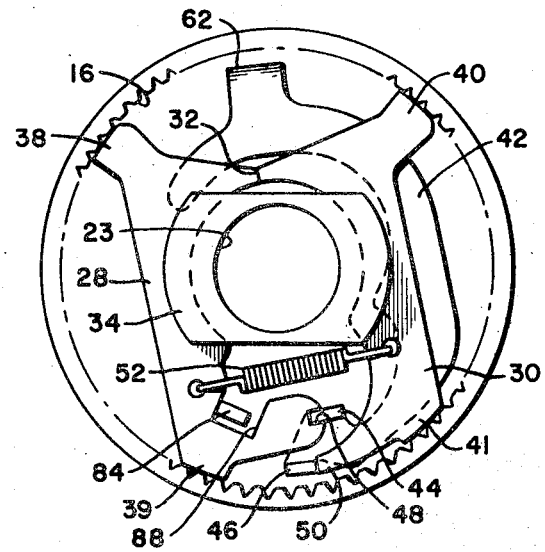
FIG. 5 is a view of the clutch similar to FIG. 2, but in the same state of wear as shown in FIG. 4.

A shoe assembly 27 comprised of a pair of frames 28 and 30 are rockably disposed about inner portion 25 of the driven member and within drum 12 abutting each other at a pivot point 32 (FIGS. 2 and 5). They are disposed in a plane perpendicular to the drive shaft 20 and are retained from displacement axially of shaft 20 by a pair of spacers 34 and 36 which themselves are spaced-apart axially of said shaft and are fashioned integrally with driven member 22. A pair of shoes 38 and 39 are fashioned integrally with frame 28, and a pair of shoes 40 and 41 are fashioned integrally with frame 30. All of the shoes extend drumwardly for frictional clutching engagement with surface 16.

A pry bar 42 which is spaced from frames 28 and 30 is rockably disposed between radial spacer 36 and a third radial spacer 45 which is also integrally fashioned with driven member 22. Said pry bar controls the frames and accordingly shoe position through the agency of a pair of integral bosses 44 and 46 which project normally beyond spacer 36 toward the shoe frames 28 and 30, from the rocking plane of said pry bar.

Boss 44 engages in a slot 48 fashioned in a frame 28 and is spaced inwardly from boss 46 relative surface 16. Boss 46 is disposed in engagement with nose 50 of frame 30. The parts are arranged and proportioned such that pry bar 42 has an axis of rotation near slot 48 and when it rocks to its extreme or coupled position counterclockwise from the uncoupled position shown in FIG. 2, bosses 44 and 46 will rock to the left and right, respectively, and cause frames 28 and 30 to rock about pivot 32, such movement being limited by the engagement of shoes 38, 39, 40 and 41 with surface 16. To the end that frame movement is symmetrical, an expansion spring 52, which has opposite ends anchored in frames 28 and 30 and is disposed on the side of shaft 20 opposite pivot 32, urges said shoes toward a disengaged or uncoupled position.

Figure 4:
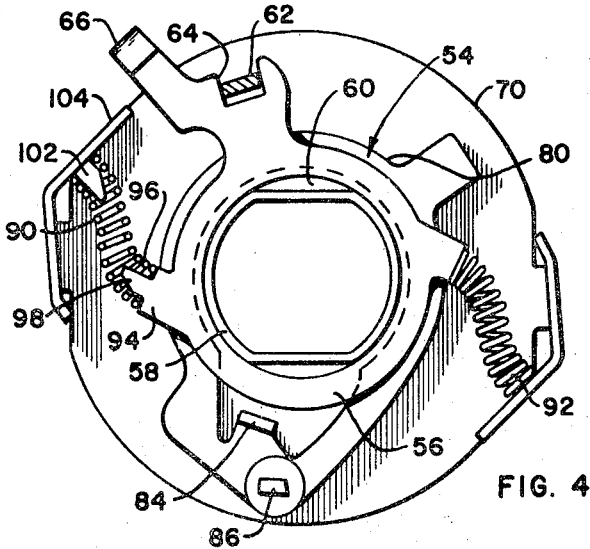
FIG. 4 is a view according to the line 4—4 on FIG. 1, but on a reduced scale, the clutch parts being in a coupled condition and in a state of wear advanced from the state of wear shown in FIG. 2.

An angularly moveable component, being a clutch actuator 54, controls pry bar 42. It has an annular body 56 which is rockably disposed, being concentric with shaft 20. It is mounted on a ring 58, which is itself keyed on driven member 22, and is disposed between spacer 45 and a flange 60 which is integral with ring 58. The actuator is moveable angularly between a first or normal position (FIGS. 4 and 5) in which the clutch is coupled to shaft 20, shoes 38, 39, 40 and 41 then being frictionally engaged with drum 14, and a second position in which the shoes are disengaged and the clutch is in an uncoupled condition (FIGS. 1 and 2). The control exercised over the pry bar by the actuator is through the agency of a lug 62 which projects normally from the pry bar 42 over spacer 45 and snugly is received in a slot 64 formed in the actuator. Accordingly, the positions of the pry bar and actuator correspond each to the other.

A trip arm 66 projects from actuator 54. It is adapted intermittently to be engaged by a reciprocative member 68 (FIG. 2) which is carried by the equipment (not otherwise shown) with which clutch 10 is employed. When thusly engaged, actuator 54 will be rocked clockwise from a coupled or normal clutch position (FIGS. 4 and 5) to an uncoupled position (FIG. 2), the shoes thereby being rocked out of frictional engagement with drum 14.

A clutch plate or disc 70 has a central opening with a margin 72 which is received in a slot 74 fashioned in driven member 22. The arrangement and proportioning of parts is such that plate 70 is perpendicular to shaft 20 and is disposed parallel to the planes of frames 28 and 30, pry bar 42 and actuator 54, from the latter of which said plate is spaced by flange 60. A friction clamp 76 is pressed into slot 74 between plate 70 and a flange 78 integrally fashioned on driven member 22 to trap plate 70. Thereby, rigid securance between said plate and the driven member is achieved.

A shoulder 80 is carried from the inner surface of clutch plate 70 about and spaced from margin 72. The construction generates a recess 82 in which flange 60 is seated. Together with said flange, said shoulder provides a bearing surface for actuator body 56.

A pair of lugs 84 and 86 which are integral with shoulder 80 and project normally therefrom comprise the agency by which coupling torque is transmitted from driving member 12 through frame 28 to driven member 22, when clutch 10 is in coupled condition. To that end, the parts are proportioned such that lug 84 is adapted to be frictionally engaged by frame member 28 in a slot 88 of which it is received. Simultaneously lug 46 of the pry bar is adapted to be trapped between nose 50 and lug 86 so that the clutch plate 70, frames 28 and 30 and pry bar 42 rotate with the drum 14, as a unit, when the clutch is engaged.

Actuator 54, pry bar 42 and shoes 39, 40 and 41 are normally urged to their coupled positions by toggle or biasing means which, in the illustrated embodiment, comprise a pair of substantially similar or like coiled compression springs 90 and 92 with straight axes when untensioned or undistorted. Said springs are arranged symmetrically and in opposed assemblies for applying torque offcenter or nonradially on said actuator from opposite directions and therefor angularly biasing said actuator counterclockwise (relative FIG. 2). One of said springs could suffice in accordance with the present invention. Accordingly, for the most part, details relating to each spring or its assembly are described hereinafter with respect to only one thereof, it being appreciated that a like characterization could be applied to the other spring or its assembly.

The assembly associated with the spring 90 comprises a boss 94 (FIG. 2) which projects outwardly from the periphery of body 56. An inner end portion 96 of spring 90 is engaged about an outer tapered end portion 98 of said boss, said spring being retained from inward movement by a shoulder 99 on said boss. The opposite end portion 100 of said spring is engaged about a tapered boss 102 which projects inwardly from an abutment flat 104 to limit outward spring movement. The abutment flat is rigidly secured and projects normally from clutch plate 70 over actuator 54 from which said abutment flat is outwardly or radially spaced.

Bosses 94 and 102 are disposed in the plane of actuator 54, and are arranged for alignment, each with the other. Spring 90 is proportioned such that upon such alignment it is fully compressed with its axis straight and a projection of its axis defining a nondiametric chord through body 56. In consequence of such arrangement, springs 90 and 92 may be defined as eccentrically disposed and when they are compressed have parallel axes. When springs 90 and 92 are compressed, shoes 38, 39, 40, and 41 are disengaged from drum 14 and the clutch is uncoupled.

When the reciprocative member 68 is removed, while springs 90 and 92 are conditioned as in FIG. 2, said springs will decompress or relax. In consequence, the springs exert forces against the opposed shoulders 99 of the actuator 54, creating a torque causing rotation of actuator 54 about the shaft 20 (counterclockwise relative FIG 2). As the springs expand, that is, move from the condition of FIG. 2 to the condition of FIG. 4, the foreces they apply decrease substantially in proportion to increase in spring length. However, the decreasing spring force is applied offcenter or nonradially on actuator 54 and along a changing vector which has an increasing distance from the center of actuator rotation.

The parts are proportioned such that, within the limits of rotation contemplated in the structure, the increase in effect on torque due to the increasing distance of the spring force from the center, is greater than the decrease of torque caused by spring relaxation. In consequence with increase in the angle through which the actuator moves to a clutch coupled condition, the clutch-coupling torque or moment increases.

The concept is illustrated in FIG. 6 in which the solid line represents the uncoupled condition of the clutch and the phantom line represents F), coupled condition of the clutch. Torque (T) applied in the uncoupled clutch condition equals the product of the force (F) of spring 90 along its line of application in uncoupled condition and the distance (R) through which it operates to cause rotation of actuator 54. Torque (T′) applied in the coupled clutch condition equals the product of (F′) and (R′), F′ being the spring force along its line of application in coupled condition and equal to the algebraic sum of (F-F), *and R′ being the distance through which force F′ acts and equal to the algebraic sum of R and r, where f is the portion of spring strength lost due to spring relaxation and r is the increase in the distance through which spring force acts and resulting from movement of actuator 54 to the coupled condition.*

The last-described phenomenon has a practical application. That is to say, as surface 16 of drum 14 wears, the angle through which actuator 54 will be required to move from an uncoupled condition to a coupled condition increases. In other words, the shoes must be driven farther from an uncoupled condition to reach the periphery of the drum when worn as in FIG. 5 than to reach the periphery of the drum when worn less, as in FIG. 2. In accordance with the present invention, the parts can be proportioned such that the torque exerted on actuator 54 will reach its greatest magnitude in a condition in which drum wear is the highest level contemplated in the clutch. In conventional friction clutches, opposite results obtain.

As many modifications in the described construction could be conceived, and as many changes could be made therein without departing from the spirit and scope of the claims, it is intended that all matter contained in the accompanying specification shall be considered as illustrative only and not in a limiting sense.

I claim:

1. In a friction clutch wherein a movable shoe comprises means for releasably coupling together a shaft and a drum which are arranged for rotation about a common axis, and the position of the shoe when the shaft and drum are coupled varies according to the condition of drum wear the combination of:

a component having a rocking axis coaxial with said shaft, said component journaled about and rockable independently of said shaft between a first angular condition in which said shaft and drum are coupled through said shoe and a second angular condition in which said shoe is disengaged and said shaft and drum are uncoupled; and compression spring means eccentrically engaged directly with said component for urging said component angularly about said rocking axis into said first angular condition and increasing clutch force as said shoe moves toward a position coupling said shaft and drum from a position in which said shaft and drum are uncoupled, and for each of said conditions, the compression spring means having a vector of spring force and the component having a radial distance from said rocking axis and perpendicular to said vector, said distance increasing as said spring means expand, said spring means and component proportioned such that the effect on the moment for moving said shoe and resulting from increase in said distance due to wear is greater than the loss of torque due to expansion of said spring.

2. A combination according to claim 1 where in said shoe is disposed within said drum and said component and said compression spring means are disposed without said drum.

3. In a friction clutch wherein a movable shoe assembly comprises means for releasably coupling a first and second member together for rotation about an axis and said assembly is biased outwardly from said axis from an uncoupled position toward a clutch coupling position in association with a drum from said first member and concentric with said second member, the combination comprising:
- a unitary clutch actuator mounted for rocking about said second member and concentrically to said axis;
- means connected to said clutch actuator for releasably moving said shoe assembly in a plane perpendicular with said axis and to said uncoupled position;
- a plate disposed in a plane parallel to said clutch actuator and normal to said axis, said plate fixed from said second member for rotation about said axis;
- a pair of abutments projecting normally from said plate over said actuator; and
- a pair of coiled compression springs bearing from said abutments nonradially and symmetrically from opposite directions against said actuator for urging said shoe assembly toward said coupling condition.

4. A combination according to claim 3 wherein the means for moving said shoe assembly comprises a pry bar rockably disposed about said axis medially of said actuator and said shoe assembly, said pry bar having oppositely extending parts operably engaged with said clutch actuator and said shoe assembly.

* * * * *